United States Patent [19]

Oshima et al.

[11] Patent Number: 5,091,134
[45] Date of Patent: Feb. 25, 1992

[54] PROCESS AND APPARATUS FOR COOLING EXTRUDED THERMOPLASTIC FILM

[75] Inventors: Yoshitomo Oshima; Kazumi Tou, both of Shizuoka, Japan

[73] Assignee: Fuji Photo Film Co., Ltd., Kanagawa, Japan

[21] Appl. No.: 654,468

[22] Filed: Feb. 13, 1991

[30] Foreign Application Priority Data

Feb. 16, 1990 [JP] Japan .................................. 2-33822

[51] Int. Cl.⁵ ............................................. B29C 47/88
[52] U.S. Cl. .......................... 264/176.1; 264/211.13; 264/216; 425/72.1; 425/224; 425/378.1
[58] Field of Search ............... 264/85, 169, 216, 176.1, 264/211.13; 425/174.8 E, 224, 72.1, 378.1

[56] References Cited

U.S. PATENT DOCUMENTS

| | | | |
|---|---|---|---|
| 3,141,194 | 7/1964 | Jester | 264/216 |
| 3,159,696 | 12/1964 | Hodgson, Jr. | 264/216 |
| 3,502,757 | 3/1970 | Spencer | 264/169 |
| 3,709,964 | 1/1973 | DeGeest et al. | 264/216 |
| 4,255,365 | 3/1981 | Heyer | 264/216 |

FOREIGN PATENT DOCUMENTS

| | | | |
|---|---|---|---|
| 22542 | 6/1974 | Japan | 425/224 |
| 20549 | 6/1978 | Japan | 264/216 |

Primary Examiner—James Lowe
Attorney, Agent, or Firm—Sughrue, Mion, Zinn, Macpeak & Seas

[57] ABSTRACT

Air is blown on the surface reverse to a cooling drum of the thermoplastic resin film extruded onto the cooling drum. The air is decelerated and is continuously varied in the velocity. An air nozzle to blow air on the surface reverse to a cooling drum of the thermoplastic resin film extruded onto the cooling drum, not less than two air supply openings disposed along the circumferential direction of the drum and a reduction filter covering the air supply openings are provided. The cleaning times of the air nozzle can be reduced, and the thermoplastic resin film is always held in an excellent quality.

6 Claims, 2 Drawing Sheets

PROCESS AND APPARATUS FOR COOLING EXTRUDED THERMOPLASTIC FILM

BACKGROUND OF THE INVENTION

This invention relates to a cooling process for thermoplastic resin film which cools the out surface reverse to a cooling drum of a thermoplastic resin film extruded onto a cooling drum by air flown out through air nozzles in addition to the cooling by the cooling drum, and an apparatus therefor.

In general, a melted thermoplastic resin is extruded onto a cooling drum in a thin film through a die, and cooled by the cooling drum to produce a thermoplastic resin film. Besides, it is known that a surface reverse to the cooling drum of the thermoplastic resin film (a surface not touching the cooling drum) is blown to be cooled by an auxiliary cooling apparatus in order to cool the surface effectively.

Such an auxiliary cooling apparatus, for example, has at least three air supply openings for blowing clean air, and the length of respective air supply openings in a right angle direction to the transporting direction of the thermoplastic resin film is longer than the width of the film. Each air supply opening has an air blowing angle wherein the extended straight line in the blowing direction conforms to a tangent of the cooling drum, and has exhaust grooves between the air supply openings (Japanese Patent Besides, there is a pinning apparatus to press an extruded thermoplastic resin film on a cooling drum which also has a construction to blow air toward the thermoplastic resin film although it is not the auxiliary cooling apparatus. In the pinning apparatus, a plate having very small holes, a porous material or a very fine mesh is attached to the end of the blow-off pipes (Japanese Patent KOKAI NO. 61-239928), and the other means are also disclosed in Japanese Patent KOKAI Nos. 61-135725, 48 4564 and the like.

In the above conventional cooling apparatuses, since the end portion of the air nozzle is at a low temperature, low molecular weight substances sublimated from the thermoplastic resin are condensed on the end surface of the air nozzle.

Moreover, the escape of the blown air toward the die can not be prevented completely. Therefore, the low molecular weight substances sublimated from the thermoplastic resin are condensed in a powder state by cooling with blown air, and the powder drops on the thermoplastic resin film. The blown air impinges on the thermoplastic resin film in a melting state resulting to affect the flatness and thickness adversely.

The pinning apparatus to press a thermoplastic resin film on a cooling drum is almost the same as the cooling apparatus in view of blowing air on a thermoplastic resin film, but since the object of the pinning apparatus is only in pressing the thermoplastic resin film on a cooling drum, the cooling effect on the extruded film is little.

SUMMARY OF THE INVENTION

An object of the invention is to provide a cooling process for a thermoplastic resin film and an apparatus therefor wherein low molecular weight substances sublimated from the thermoplastic resin film does not condense on the surface of the air nozzle.

Another object of the invention is to provide a cooling process for a thermoplastic resin film and an apparatus therefor which can produce a thermoplastic resin film held in a high quality.

Thus, the cooling process for a thermoplastic resin film of the invention comprises blowing air on the surface reverse to a cooling drum of the thermoplastic resin film extruded onto the cooling drum, the air being decelerated and being continuously varied in the velocity along the circumferential direction through a reduction filter covering not less than two air supply openings provided on an air nozzle.

The cooling apparatus for a thermoplastic resin film comprises an air nozzle to blow air on the thermoplastic resin film extruded onto a cooling drum to cool the opposite side of the film to the drum, not less than two air supply openings disposed along the circumferential direction of the drum and a reduction filter covering the air supply openings.

Figure 1:
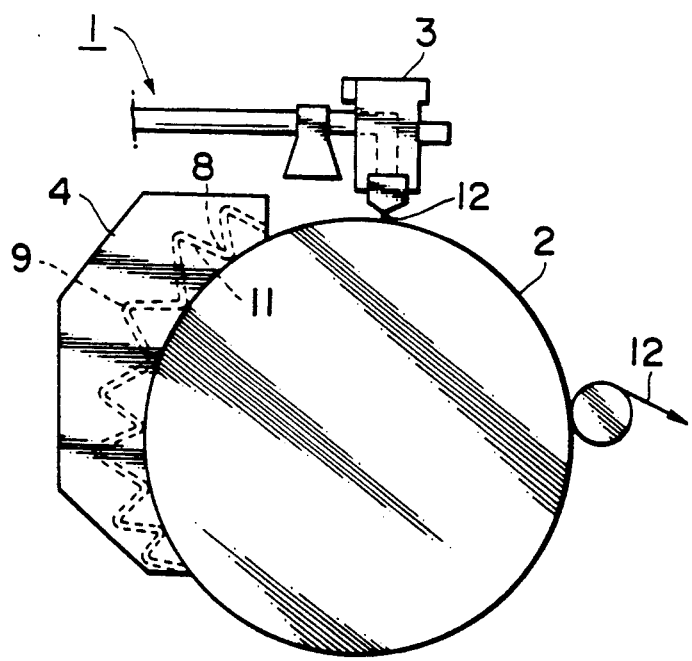
FIG. 1 is a side view of an apparatus for manufacturing a thermoplastic resin film attached with a cooling apparatus embodying the invention.

2 ... Cooling drum
4 ... Cooling apparatus
5 ... Air nozzle
10 ... Air supply opening
11 ... Reduction filter

DETAILED DESCRIPTION OF THE INVENTION

The reduction filter provided for decelerating the wind velocity of the air blown through the air supply openings and has a construction so that air can be blown out through small holes. The material of the reduction filter may be a porous material and a mesh material. The porous material includes porous ceramics, a sintered metal sheets, sintered metal powder sheets and the like. The mesh material includes various wire meshes, sintered metal fiber sheets, non woven fabrics, various filters and the like.

The reduction filter is preferably in a form of a multi folding plate including corrugated plates so that the blown air can efficiently escape in the width direction of the cooling drum. A suitable folding number is two or more, and 5 to 30 is preferred.

Not less than two air supply openings of the air nozzle are disposed at a suitable interval in a circumferential direction over the cooling drum. The number, distance, shape and the like of the air supply openings are suitably selected according to the diameter and the revolution speed of the cooling drum, the thickness of the thermoplastic resin film and the like. In any event, a suitable position is each folded part on the side near the cooling drum.

The thermoplastic resin being a material for the thermoplastic resin film includes various polyester resins, various polyethylene resins, various polypropylene resins, polystyrene resins, ethylene-vinyl acetate resins, polyvinyl chloride resins and the like.

In the cooling process for a thermoplastic resin film and the apparatus therefor of the invention, air is blown at a suitable interval in the circumferential direction of the cooling drum through not less than two air supply openings formed at the end of the air nozzle. The air blown out through the air supply openings is pressure-reduced and rectified by the reduction filter, and then, the air is blown on the surface reverse to the drum of the thermoplastic resin film. Due to the interval of the air supply openings and the multi-folding shape of the air nozzle, the velocity of the blown air varies continuously along the circumferential direction of the drum, and the air is blown through all the surface of the reduction filter. Therefore, the reduction filter does not become at a low temperature, and the low molecular weight substances sublimated from the thermoplastic resin film are not condensed on the surface of the reduction filter. As a result, the cleaning frequency of the air nozzle can be reduced. Moreover, on the surface reverse to the cooling drum of the thermoplastic resin film, the wind pressure is the highest in front of the air supply openings and the lowest between the openings, and the blown air goes back through the low pressure portion to prevent the escape of the blown air toward the die completely. Therefore, the low molecular weight substances sublimated from the thermoplastic resin does not adhere to the thermoplastic resin film and the air blown through the air supply openings does not affect adversely the flatness, the thickness and the like of the thermoplastic resin film in a melted state. Thus, the thermoplastic resin film is always held in an excellent quality.

EXAMPLE

Figure 2:
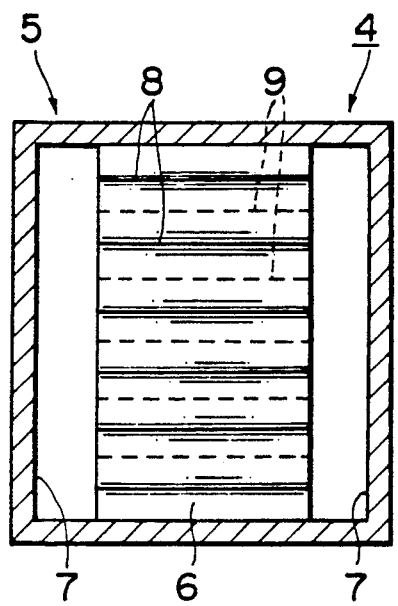
FIG. 2 is a vertical sectional view of the above cooling apparatus.
Figure 3:
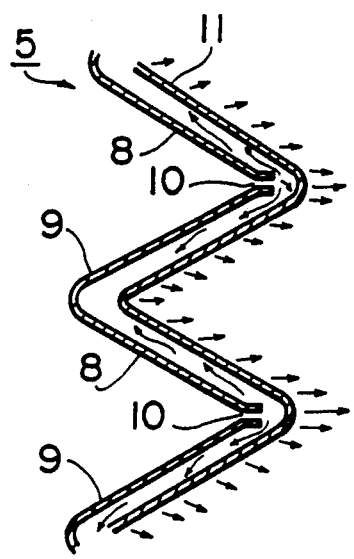
FIG. 3 is a partially sectional view of the air nozzle of the cooling apparatus.

As shown in FIG. 1, an apparatus 1 for manufacturing a thermoplastic resin film includes a cooling drum 2 a die 3 and the cooling apparatus 4 disposed near the surface of the cooling drum 2. The cooling drum 2 has a surface cooling apparatus (not illustrated) to cool the surface of the cooling drum for cooling the thermoplastic resin film extruded onto the surface, and can rotate at any speed. The die 3 extrudes a melted thermoplastic resin on the surface of the cooling drum 2 to form the thermoplastic resin film. The cooling apparatus 4 has an air nozzle 5 to blow air on the thermoplastic resin film and an air supply source (not illustrated) to supply air to the air nozzle 5. The air nozzle 5, as shown in FIGS. 2 and 3, has an air supply part 6 through which air is fed and an air exhaust part 7 through which air is exhausted. The end of the air supply part 6 is formed in a concentric circle of the cooling drum 2 and projecting parts 8 and trough portions 9 forming a multi-folding plate are alternately formed along the circumferential direction of the cooling drum 2, and as a result, the end of the air supply part 6 is in about a saw blade shape in a section. Some air supply openings 10 being a slit are formed at each most end portion in width direction of the cooling drum 2. The air exhaust part 7 is disposed along the circumferential direction of the cooling drum 2 on the both sides of the projecting parts 8 and the trough portions 9. The air exhaust part 7 is connected to the trough portions 9, and the air blown on the thermoplastic resin film through the air supply openings 10 is exhausted outside through the trough portions 9 and the air exhaust part 7. A reduction filter 11 is disposed in some distance from all the end surface of the air supply part 6.

A process for cooling a thermoplastic resin film by using the above apparatus is described below.

First, a melted thermoplastic resin is extruded onto the surface of the rotating cooling drum 2 in a film shape through the die 3. The extruded thermoplastic resin film 12 adheres to the cooling drum to be cooled, and is revolved together with the cooling drum 2. Then the thermoplastic resin film 12 is transported to the air nozzle 5 portion and the surface reverse to the drum 2 of the film 12 is cooled there.

That is, air is fed to the air supply part 6 of the air nozzle 5 from the air supply source. The fed air is blown out from the air supply openings 10 at a high velocity and the space between the air supply part 6 and the reduction filter 11 is filled with the blown air. Therefore, the air filled in the space is decelerated and rectified by the reduction filter 11, and is blown out from all the surface of the reduction filter 11 at a relatively low velocity in a arranged flow state. The velocity of the air blown out from the reduction filter 11 increases according to nearing the air supply openings 10, and therefore, the velocity continuously increases or decreases along the circumferential direction of the cooling drum 2.

Air blown out through the reduction filter 11 touches the thermoplastic resin film 12 to cool the surface reverse to the cooling drum, and the air bounds from the thermoplastic resin film 12. At that time, high air velocity portions flow to low air velocity portions, and therefore, all the air is transported to the air exhaust part 7 through the trough portions 9.

EXAMPLE 1

The apparatus illustrated in FIG. 1 to 3 was used. A sintered metal fiber mesh sheet ("Fuji Plate 5 um" Fuji Filter Kogyo K.K.) was used as the reduction filter 11. The distance between the air supply opening 10 and the cooling drum 2 was 40 mm, and the velocity of the air blown through the air supply opening 10 was 10 m/sec. The velocity of the air blown through the reduction filter 11 was 1 m/sec. on average.

When the apparatus worked in the above conditions, the cleaning interval of the air nozzle was 360 hours. Moreover, the thermoplastic resin film extruded through the die did not fluctuate nor shake and a high quality film was obtained.

COMPARATIVE EXAMPLE 1

The same apparatus as Example 1 was used except that the reduction filter was not used. The distance between the air supply opening 10 and the cooling drum 2 was 40 mm, the velocity of the air blown through the air supply openings 10 was 14 m/sec.

When the apparatus worked in the above condition, the cleaning interval of the air nozzle was 12 hours. Moreover, thickness streaks being thick by about 10% generated in a longitudinal direction.

We claim:

1. A cooling process for cooling a thermoplastic resin film extruded onto a cooling drum, comprising blowing air through an air nozzle onto the surface of the film opposite the drum to decelerate and continuously vary the velocity of the blown air along the circumferential direction of the drum, said air nozzle comprising an air supply part having at least two air supply openings disposed at different points along the circumferential direction of the drum and a reduction filter having a porous or mesh construction covering the air supply openings.

2. The process of claim 1, wherein the reduction filter is in the form of a multi-folding plate.

3. A cooling apparatus for a thermoplastic resin film which comprises an air nozzle for blowing air on a thermoplastic resin film extruded onto a cooling drum to cool the side of the film opposite the drum, said air nozzle comprising an air supply part having at least two air supply openings disposed at different points along the circumferential direction f the drum and a reduction filter having a porous or mesh construction covering the air supply openings.

4. The cooling apparatus of claim 3, wherein the reduction filter is in the form of a multi-folding plate.

5. The cooling apparatus of claim 3, wherein the reduction filter is arranged between the air supply openings and the cooling drum.

6. The cooling apparatus of claim 3, wherein the air nozzle further comprises an air exhaust part.

* * * * *